United States Patent [19]

Schneider

[11] 4,317,505

[45] Mar. 2, 1982

[54] HYDRAULIC APPARATUS FOR THE OPERATION OF AN ELEVATOR

[75] Inventor: Erich Schneider, Emmelshausen, Fed. Rep. of Germany

[73] Assignee: Kombi-Lift Montage- und Handelsgesellschaft mbH, Solingen, Fed. Rep. of Germany

[21] Appl. No.: 91,907

[22] Filed: Nov. 6, 1979

[30] Foreign Application Priority Data

Nov. 9, 1978 [DE] Fed. Rep. of Germany ....... 2848541

[51] Int. Cl.³ .......................................... B66B 11/04
[52] U.S. Cl. .................................. 187/17; 74/501 R; 92/137
[58] Field of Search ................. 187/17, 19; 74/501 R, 74/422, 89.17; 92/137, 140

[56] References Cited

U.S. PATENT DOCUMENTS

| | | | |
|---|---|---|---|
| 2,384,742 | 9/1945 | Hewitt | 74/501 R |
| 2,943,514 | 7/1960 | Golde | 74/501 R |
| 2,986,954 | 6/1961 | Werner | 74/501 R |
| 3,204,480 | 9/1965 | Bradbury | 74/501 R |
| 3,965,802 | 6/1976 | Jacobs | 74/501 R |

FOREIGN PATENT DOCUMENTS 1387140 3/1975 United Kingdom ............ 74/501 R

*Primary Examiner*—Robert J. Spar
*Assistant Examiner*—Kenneth Noland
*Attorney, Agent, or Firm*—John C. Smith, Jr.

[57] ABSTRACT

A hydraulic apparatus for the operation of an elevator comprises a linearly extending hydraulic cylinder and a piston slidable therein. The piston has on its downstream side a plurality of pivotally interconnected thrust members the last one of which has a slide member which is provided with a support arm with which the slide member passes through a longitudinal slot in the jacket of a linear cylinder extending in a direction parallel to the path of motion of a load receiving device and to which the load receiving device is attached. The linearly extending hydraulic cylinder and the linear cylinder are open at the lower ends and the thrust members depend downwardly at the two cylinders. The thrust members have a continuous toothing and a gear supported rotatably between the two cylinders passes through longitudinal slots in the jackets of the two cylinders and engages with the toothing.

3 Claims; 3 Drawing Figures

HYDRAULIC APPARATUS FOR THE OPERATION OF AN ELEVATOR

BACKGROUND TO THE INVENTION

This invention relates to an apparatus serving the operation of an elevator, the piston of which apparatus has downstream thereof pivotally interconnected thrust members the last one of which has a slide member which is provided with a support arm with which the slide member passes through a longitudinal slot of the jacket of a linear cylinder extending in direction parallel to the path of motion of the load receiving means and to which the load receiving means are attached.

From the German patent specification No. 22 58 065, a hydraulic apparatus for the operation of an elevator is known in which the cylinder in which the piston moves at the base merges into a curvature at which the cylinder extending in a direction parallel to the path of motion of the load receiving means is provided adjacently. Such a hydraulic apparatus has, as practice has shown, a substantial disadvantage which is that upon operation of the elevator in the area of the curvature of the one cylinder there is relatively large friction therebetween and the thrust members, cylinder and thrust members thereby being subject to premature wear. In order to eliminate this trouble it has already been started to replace the individual thrust members by a strand consisting of rubber-resilient material. Such a strand, however, only has a very limited life because of the friction between strand and cylinder.

Also, an apparatus for the operation of an elevator is known wherein the pivotally interconnected thrust members have a continuous toothing on one side into which the teeth of a driving wheel engage (German Pat. No. 93,667). The thrust members are guided for reversing between a rail and a roll, but are not exposed to motional forces. In this apparatus also a relatively large friction occurs between the thrust members as well as the rail and the roll.

SUMMARY OF THE INVENTION

It is the object of the present invention to improve a hydraulic apparatus of the species referred to initially in such a way that the thrust members are no longer exposed to friction any more at the reversing point.

To attain this object the present invention provides a hydraulic apparatus for the operation of an elevator comprising a linearly extending hydraulic cylinder having a jacket and a piston guided therein; load receiving means adapted to move through a predetermined path of motion; a further linear cylinder arranged adjacent to the hydraulic cylinder, having a jacket and extending in a direction parallel to the path of motion of the load receiving means; a plurality of pivotally interconnected thrust members having a continuous toothing, arranged downstream of the piston and extending through both cylinders, said cylinders being open at their bottom end and the thrust members depending downwardly at the two cylinders; a slide member carried by at least one of said thrust members and provided with a support arm with which it passes through a longitudinal slot in the jacket of the further linear cylinder and to which the load receiving means are attached, and a central gear supported rotatably between the two cylinders in passing through longitudinal slots in the cylinder jackets and engaging with the continuous toothing of the thrust members.

Upon pressurizing the piston guided in the linearly extending hydraulic cylinder, the thrust members guided in said cylinder are moved downwardly, and at the same time the thrust members guided in the adjacent linear cylinder are moved upwardly along with the load receiving means via the gear. The lowering of the load receiving means is effected by letting the pressure fluid flow out of the hydraulic cylinder, thereby the thrust members guided in the adjacent linear cylinder being moved downwardly again by the weight of the load receiving means and the thrust members guided in the hydraulic cylinder being returned with the piston via the gear.

The apparatus proposed by the invention is of an advance over the previously discussed prior art apparatus because the thrust members at the reversing point require no guiding any more, since they freely suspend from the cylinders. The friction occurring at reversion between the cylinder and the thrust members is thereby eliminated. The thrust members are interconnected in a simple way for instance by means of ropes which pass through holes in the thrust members. There is furthermore the possibility of arranging two instead of a single strand of thrust members, namely one strand for each cylinder, which is capable of being wound upon a drum for instance with its end passing out of the respective cylinder.

A further essential advantage of the invention is that the gear arranged between the two cylinders is able to be driven, in case the hydraulic drive of the apparatus fails. Furthermore, the drive of the gear may be effected in addition to the hydraulic drive, and in this event the hydraulic cylinder as well as the piston guided therein may be dimensioned much smaller.

An advantageous development of the apparatus of the invention resides in the measure that the thrust members have a further continuous toothing at the outside of the cylinders and mesh therewith with two rotatably mounted gears passing through longitudinal slots of the jacket of the two cylinders, said gears being arranged with the gear arranged between the two cylinders at the same level and being interconnected by means of a chain drive.

This provides for that the thrust members in engagement with the central gear arranged between the two cylinders maintain their axial positions relative to the longitudinal axis of the cylinders and thus their parallel positions relative to the jackets of the cylinders. Upon engagement of the thrust members merely with the central gear, frictional forces occur at the cylinder jackets opposite to the central gear which are compensated by the arrangement of the external gears in conjunction with the chain drive.

A further advantage of the apparatus of the invention resides in the measure that a pinion of a drive motor is in engagement with the gear arranged between the two cylinders.

Thereby, upon requirement, for instance upon failing of the hydraulic system, the countermovement of the thrust members guided in the cylinders may be effected by the drive of the central gear in that it is rotated in clockwise direction for lifting the load receiving means and in counterclockwise direction for lowering the load receiving means.

BRIEF DESCRIPTION OF THE DRAWINGS

An embodiment of the invention will now be described by way of example and with reference to the accompanying drawings in which.

DESCRIPTION OF THE PREFERRED EMBODIMENT

Figure 1:
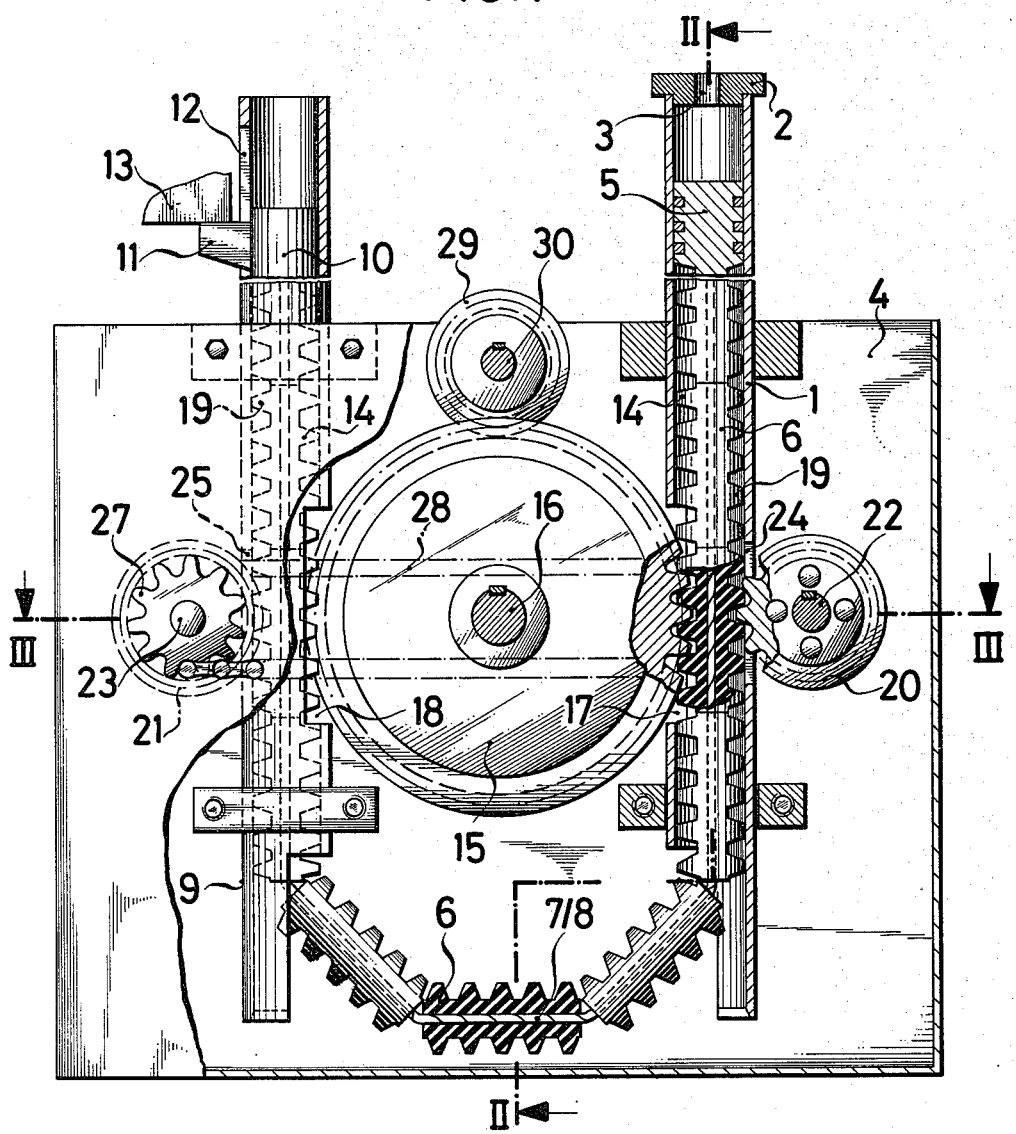
FIG. 1 is an elevational view, partially in section, of the apparatus according to the invention.
Figure 2:
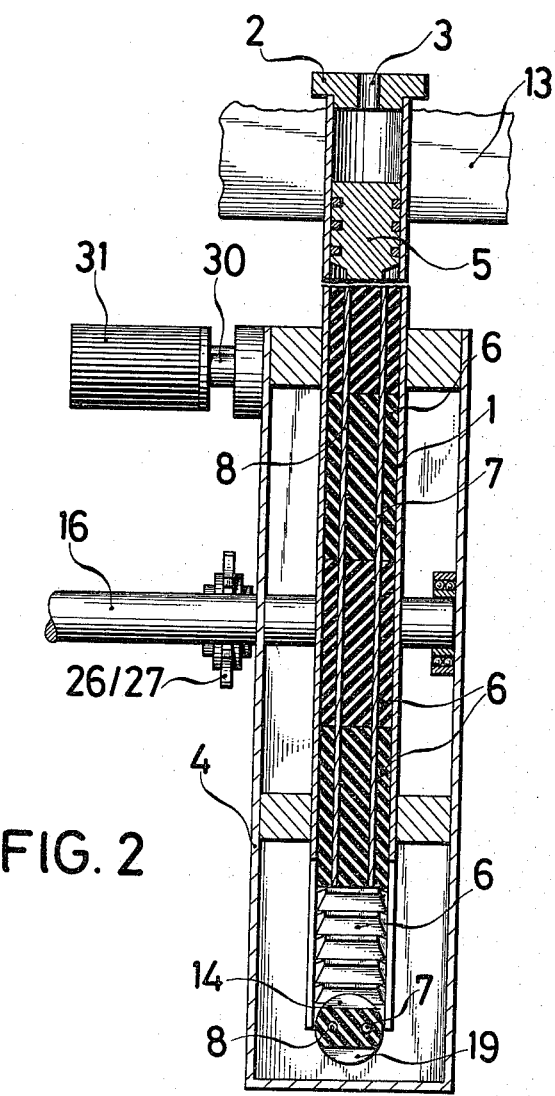
FIG. 2 is a sectional view taken along line II—II of FIG. 1.
Figure 3:
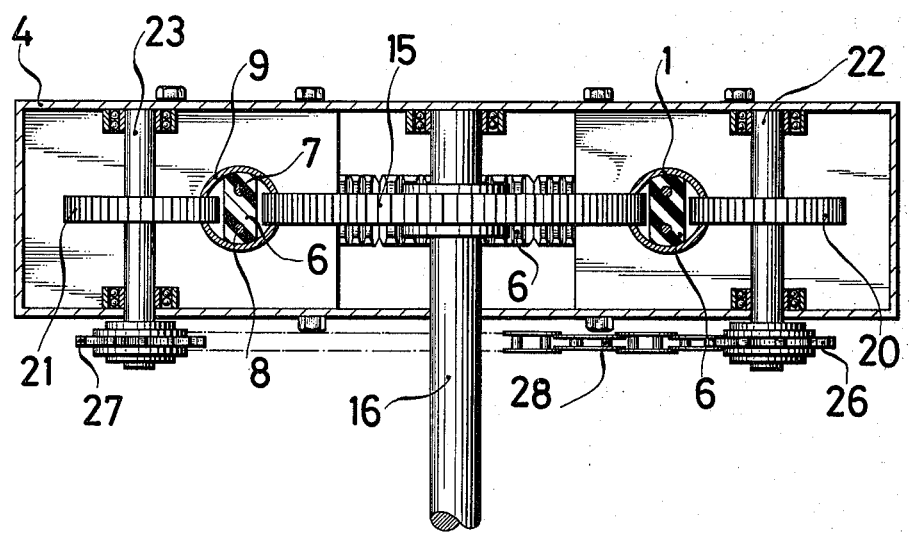
FIG. 3 is a sectional view taken along line III—III of FIG. 1.

The drawings show a hydraulic apparatus comprising a linearly extending hydraulic cylinder 1 which is closed at its upper end by means of a cap 2 and which is open at the bottom. The cap 2 has a passage 3 for the pressure fluid. The hydraulic cylinder 1 is secured to the wall of a box-shaped housing 4 open at the top, which is firmly placed onto the floor of the elevator shaft. The reference numeral 5 designates the piston of the hydraulic cylinder 1 downstream of which there are a plurality of elongated thrust members 6. The thrust members 6 have a circular cross section. They are hingedly interconnected by two ropes 7 and 8 which pass through longitudinally extending holes of the thrust members 6. Spaced from the hydraulic cylinder 1, a further linear cylinder 9 is arranged which extends in a direction parallel to the path of motion of the load receiving means. The further linear cylinder 9 which has the same inner diameter as the hydraulic cylinder 1 is likewise fixedly arranged at a wall of the housing 4 and open at the bottom like the hydraulic cylinder 1. The thrust members 6 are guided at the internal wall of the cylinders 1 and 9 and depend downwardly from these cylinders. Adjacent to the last thrust member 6 remote from the piston 5 there is provided positively connected a slide member 10 which is provided with a support arm 11. The slide member 10 passes with the support arm 11 through a longitudinal slot 12 in the jacket of the further cylinder 9. The reference numeral 13 designates the load receiving means which may be a cabin and which is secured to the support arm 11 of the slide member 10. The thrust members 6 have continuous toothing 14. A central gear 15 is firmly arranged on a shaft 16 between the cylinders 1 and 9. This central gear 15 passes with its teeth through a slot 17 in the jacket of the hydraulic cylinder 1 and a slot 18 in the jacket of the further cylinder 9 and engages the toothing 14 of the thrust members 6. The thrust members 6 have a further continuous toothing 19. The reference numerals 20 and 21 designate two external gears which are firmly placed upon shafts 22 and 23. The gear 20 passes through a longitudinal slot 24 in the jacket of the hydraulic cylinder 1 and engages with its teeth the toothing 19 of the thrust members 6. The gear 21 passes through a longitudinal slot 25 in the jacket of the further cylinder 9 and engages with its teeth likewise the toothing 19 of the thrust members 6. The shafts 22 and 23 of the gears 20 and 21 pass through the wall of the housing 4. On the ends projecting beyond the housing 4, of the shafts 22 and 23, sprockets 26 and 27 are fixedly located which have looped thereabout a link chain 28. The central gear 15 meshes with a pinion 29 which is keyed to a shaft 30 of a drive motor 31.

The operation of the apparatus is thus:

Upon actuating a switch, a pump not illustrated in the drawings passes the pressure fluid to the cylinder space of the hydraulic cylinder 1, thereby the thrust members 6 guided in the cylinder 1 being moved downwardly. In doing so, the central gear 15 is rotated clockwise, thereby the thrust members 6 with the load receiving means 13 being lifted, said thrust members 6 being guided in the further cylinder 9. The external gears 20 and 21 are rotated counterclockwise and so ensure that the thrust members 6 meshing with the central gear 15 maintain their axial positions relative to the longitudinal axis of the jackets of the cylinders 1 and 9 and thus their parallel positions relative to the jackets of the cylinders 1 and 9. The lowering of the load receiving means 13 is effected by letting the pressure fluid flow out of the cylinder space, thereby the thrust members 6 guided in the further cylinder 9 being moved downwardly by the weight of the load receiving means 13. In doing so, the central gear 15 is rotated in counterclockwise direction, thereby the thrust members 6 guided in the hydraulic cylinder 1 being returned again with the piston 5. In this process it is also ensured by the external gears 20 and 21 which are now rotated clockwise that the thrust members 6 meshing with the central gear 15 maintain their axial positions relative to the longitudinal axis of the jackets of the cylinders 1 and 9 and thus their parallel positions relative to the jackets of the cylinders 1 and 9.

For supporting the hydraulic system or upon failing thereof, the central gear 15 may be driven by means of the drive motor 31 via the pinion 29 in that the central gear 15 is rotated clockwise for lifting the load receiving means 13 and counterclockwise for lowering the load receiving means 13.

The invention may be embodied in other specific forms without departing from the spirit or essential characteristics thereof. The embodiment is therefore to be considered in all respects as illustrative and not restrictive.

What is claimed is:

1. A hydraulic apparatus for the operation of an elevator comprising
    (a) a linearly extending hydraulic cylinder having a jacket and a piston guided therein;
    (b) load receiving means adapted to move through a predetermined path of motion;
    (c) a further linear cylinder arranged adjacent to the hydraulic cylinder, having a jacket and extending in a direction parallel to the path of motion of the load receiving means;
    (d) a plurality of pivotally interconnected thrust members having a continuous toothing, arranged downstream of the piston and extending through both cylinders, said cylinder being open at their bottom end and the thrust members depending downwardly at the two cylinders;
    (e) a slide member carried by at least one of said thrust members are provided with a support arm with which it passes through a longitudinal slot in the jacket of the further linear cylinder and to which the load receiving means are attached;
    (f) a central gear supported rotatably between the two cylinders in passing through longitudinal slots in the cylinder jackets and engaging with the continuous toothing of the thrust members; and
    (g) two rotatably mounted external gears, each passing through another longitudinal slot of the jacket of a respective one of said two cylinders and engaging with said continuous toothing of said thrust members, said external gears being arranged at the same level as said central gear between said two cylinders and being interconnected by means of a chain drive.

2. A hydraulic apparatus as set forth in claim 1, wherein a pinion of a drive motor is in engagement with the central gear supported rotatably between the two cylinders.

3. Hydraulic apparatus for the operating of an elevator comprising:
 (a) a substantially vertically disposed elongated hydraulic cylinder open at its bottom end and having a piston arranged to move therethrough;
 (b) load receiving means arranged to move along a predetermined path;
 (c) a substantially vertically disposed elongated further cylinder open at its bottom end and extending parallel to said predetermined path of said load receiving means, said further cylinder having a longitudinal slot in the wall thereof;
 (d) a strand of a plurality of serially arranged elongated thrust members and means pivotally joining adjacent thrust members, said strand of thrust members extending along a path, the first part of said path extending downwardly from said piston through said open end of said hydraulic cylinder, the last part of said path extending upwardly through said bottom end of said further cylinder, and the intermediate part of said path extending between said first and last parts;
 (e) each of said thrust members having a plurality of regularly spaced teeth on opposite sides thereof and the spacing between adjacent teeth of adjacent thrust members when said thrust members are disposed in a straight line being the same as the spacing between said teeth of each of said thrust means;
 (f) a slide member in said further cylinder and carried by at least one of said thrust members;
 (g) a support arm extending from said slide member, through said slot in the wall of said further cylinder, to said load receiving means;
 (h) a central gear rotatably supported between said first and last portions of said path, the teeth of said gear engaging said teeth of said thrust members along said first and last portions of said path;
 (i) two rotatably mounted external gears, one of said external gears engaging the teeth of said thrust members in the first part of said path and the other of said external gears engaging the teeth of said thrust members in the last part of said path, said external gears and central gear being at the same level; and
 (k) drive means interconnecting said external gears;
 (l) whereby movement of said piston in opposing directions causes said gear to rotate in opposing directions and said slide member to move in opposing directions.

* * * * *